United States Patent
Ding et al.

(10) Patent No.: US 12,474,128 B2
(45) Date of Patent: Nov. 18, 2025

(54) HEAT EXCHANGE FIN, HEAT EXCHANGER, AND HEAT PUMP SYSTEM

(71) Applicant: Carrier Corporation, Palm Beach Gardens, FL (US)

(72) Inventors: Chao Ding, Shanghai (CN); Liang Xiang, Shanghai (CN); Yang Ge, Shanghai (CN); Weijie Shao, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 31 days.

(21) Appl. No.: 18/344,195

(22) Filed: Jun. 29, 2023

(65) Prior Publication Data
US 2024/0003637 A1 Jan. 4, 2024

(30) Foreign Application Priority Data
Jul. 1, 2022 (CN) .......................... 202210767154.8

(51) Int. Cl.
*F28F 1/32* (2006.01)
*F28F 1/24* (2006.01)

(52) U.S. Cl.
CPC . *F28F 1/32* (2013.01); *F28F 1/24* (2013.01)

(58) Field of Classification Search
CPC ..................................................... F28F 1/325
See application file for complete search history.

(56) References Cited

U.S. PATENT DOCUMENTS

| | | | |
|---|---|---|---|
| 4,691,768 A | 9/1987 | Obosu | |
| 4,860,822 A * | 8/1989 | Sacks | F28F 1/325 165/181 |
| 5,042,576 A | 8/1991 | Broadbent | |
| 5,056,594 A | 10/1991 | Kraay | |
| 5,062,475 A | 11/1991 | Bemisderfer et al. | |
| 5,111,876 A | 5/1992 | Nash | |

(Continued)

FOREIGN PATENT DOCUMENTS

| | | |
|---|---|---|
| CN | 206191985 U | 5/2017 |
| CN | 214009397 U | 8/2021 |

(Continued)

OTHER PUBLICATIONS

Extended European Search Report received for EP Application No. 23183097.7, mailed on Oct. 27, 2023, 6 Pages.

*Primary Examiner* — Eric S Ruppert
(74) *Attorney, Agent, or Firm* — Drew Folgmann

(57) ABSTRACT

The invention relates to a heat exchange fin, with a tube hole formed thereon for a heat exchange tube to be inserted into. A corrugated structure is arranged near the tube hole. The corrugated structure comprises a wave section arranged along a flow direction of fluid medium. The distance between two adjacent wave crests or wave troughs of the wave section is one wavelength. The total length of the wave section is 1-1.5 times the wavelength. A bridge plate is arranged at the wave crests and wave troughs of the wave section, respectively. The bridge plate deflects relative to the wave crests and wave troughs by a preset distance. The invention also proposes a heat exchanger configured with the heat exchange fins, and a heat pump system configured with the heat exchanger.

13 Claims, 2 Drawing Sheets

(56) References Cited

U.S. PATENT DOCUMENTS

| | | | |
|---|---|---|---|
| 5,168,923 A * | 12/1992 | Sacks | F28F 1/12 |
| | | | 29/890.047 |
| 5,353,866 A | 10/1994 | Ueda et al. | |
| 5,360,060 A | 11/1994 | Tanaka et al. | |
| 5,752,567 A | 5/1998 | Obosu | |
| 5,927,393 A * | 7/1999 | Richter | F28F 1/32 |
| | | | 165/182 |
| 7,124,813 B2 | 10/2006 | Kester | |
| 8,267,160 B2 | 9/2012 | Hancock | |
| 2004/0050539 A1 | 3/2004 | Bemisderfer | |
| 2010/0218533 A1* | 9/2010 | Lee | F25B 39/00 |
| | | | 165/181 |

FOREIGN PATENT DOCUMENTS

| | | | |
|---|---|---|---|
| CN | 215337931 U | 12/2021 | |
| EP | 0005959 B1 | 3/1982 | |
| EP | 0319451 A1 | 6/1989 | |
| EP | 2985558 A1 | 2/2016 | |
| JP | 11183076 A * | 7/1999 | F28F 1/325 |

\* cited by examiner

HEAT EXCHANGE FIN, HEAT EXCHANGER, AND HEAT PUMP SYSTEM

CROSS REFERENCE TO RELATED APPLICATIONS

This application claims priority to Chinese Patent Application No. 202210767154.8 filed on Jul. 1, 2022.

FIELD OF THE INVENTION

The invention relates to the technical field of heat dissipation, in particular to a heat exchange fin, and also relates to a heat exchanger configured with the heat exchange fin, and a heat pump system configured with the heat exchanger.

BACKGROUND OF THE INVENTION

A heat exchanger, also known as a thermal transducer, is a device that transfers heat from a hot fluid to a cold fluid. Heat exchangers are important equipment in engineering heat transfer, which are widely used in the fields of petroleum, chemical engineering, power, construction, machinery, and the like. For example, in a heat pump system or an air conditioning system, a heat exchanger is usually required for heat exchange in order to achieve cooling and/or heating. This kind of heat exchanger has the advantages of compact structure, small volume, light weight, and high heat transfer efficiency etc.

With the development of heat exchange technologies, the volume of heat exchangers is strictly limited, while the requirements for heat exchange performance of heat exchangers are increasingly demanding. The heat exchange function of heat exchangers in the prior art mainly come from the heat exchange fins arranged inside, which are generally made of aluminum material. The main factors affecting the heat exchange efficiency of the fins are the heat transfer coefficient and contact area between the surface of the heat exchange fins and the fluid medium passing through the heat exchanger. When the overall volume of the heat exchanger is fixed, the use of corrugated heat exchange fins is an effective way to increase the heat exchange contact area of the fins. As shown in FIG. 1, a tube hole 11 is provided on the heat exchange fin, where the tube hole 11 can be connected to a metal heat exchange tube (not shown). When the refrigerant inside the metal heat exchange tube flows, the refrigerant can transfer temperature to the fin body, and achieve convective heat transfer with external fluid media, such as air, through the fin body. The base of the heat exchange fin usually has strong thermal conductivity, which can quickly diffuse the heat from the metal heat exchange tube to other positions on the base of the heat exchange fin. In order to enhance the heat exchange effect, a corrugated structure 12 is arranged near the tube hole 11, where the corrugated structure 12 comprises a wave section arranged along the flow direction of air. The distance between two adjacent wave crests or wave troughs of the wave section is one wavelength, where the total length of the wave section is 2 times the wavelength. In other words, the heat exchange fin shown in FIG. 1 employs a "two-wave/row" corrugated structure 12, which means that the total length of the wave section in a row of corrugated structure is designed to be 2 times the wavelength. In addition, a bridge plate 13 deflected outwardly is also arranged at the wave crests and the wave troughs of the wave section, respectively.

However, the aforementioned heat exchange fin still has drawbacks and shortcomings in aspects such as structural configuration and heat exchange effect, which can be further improved and optimized.

SUMMARY OF THE INVENTION

In view of the foregoing, according to a first aspect of the invention, a heat exchange fin is provided, which effectively solves the aforementioned problems and problems in other aspects existing in the prior art. In a heat exchange fin according to the invention, a tube hole is formed on the heat exchange fin for a heat exchange tube to be inserted into, and a corrugated structure is arranged near the tube hole. The corrugated structure comprises a wave section arranged along a flow direction of fluid medium, where the distance between two adjacent wave crests or wave troughs of the wave section is one wavelength, and the total length of the wave section is 1-1.5 times the wavelength, wherein, a bridge plate is further arranged at the wave crests and wave troughs of the wave section, respectively, where the bridge plate deflects relative to the wave crests and wave troughs by a preset distance.

In another embodiment of the heat exchange fin according to the invention, the wave section forms a corrugation having a sinusoidal, cosine, trapezoidal, or triangular cross-section along a longitudinal cross-sectional direction of the flow direction of fluid medium.

In still another embodiment of the heat exchange fin according to the invention, the corrugated structure is located above or below the tube hole in the vertical direction and is symmetrically arranged relative to the vertical plane where the centerline of the tube hole is located.

In yet another embodiment of the heat exchange fin according to the invention, adjacent bridge fins deflect in opposite directions in the vertical direction.

In still another embodiment of the heat exchange fin according to the invention, the bridge plate deflects relative to the wave crest and wave trough by a preset distance in the range of 0.6-1.0 (millimeter) mm; and/or the width of the bridge plate is in the range of 2.6-3.0 mm.

In a further embodiment of the heat exchange fin according to the invention, the bridge plate is formed by stamping.

In another embodiment of the heat exchange fin according to the invention, the heat exchange fin is made of aluminum alloy.

In addition, according to a second aspect of the invention, a heat exchanger is also provided, which comprises:
  a plurality of heat exchange tubes for refrigerant flow, wherein the heat exchange tubes are separated from each other; and
  a plurality of the aforementioned heat exchange fins, wherein the heat exchange fins are vertically inserted into by the heat exchange tubes and are spaced at a preset distance from each other.

In a further embodiment of the heat exchanger according to the invention, the bridge plate deflects relative to the wave crest and wave trough by a preset distance that is half the distance between adjacent heat exchange fins.

In another embodiment of the heat exchanger according to the invention, the heat exchanger is a condenser or an evaporator.

Furthermore, according to a third aspect of the invention, a heat pump system is further provided, which comprises the aforementioned heat exchanger.

It can be appreciated that the heat exchange fins of the invention employ a specially designed corrugated structure, which not only reduces the resistance of fluid medium passing through the heat exchange fins, but also increases the heat exchange capability of the heat exchange fins, thereby achieving high-efficiency heat exchange.

BRIEF DESCRIPTION OF THE DRAWINGS

In order to provide a clearer explanation of the technical solutions in the embodiments of the invention or in the prior art, the accompanying drawings required for the depiction of the embodiments or the prior art will be introduced in brief. It is evident that the accompanying drawings described below only show some embodiments of the invention. To those skilled in the art, other accompanying drawings can be obtained based on these drawings without any creative effort.

DETAILED DESCRIPTION OF EMBODIMENT(S) OF THE INVENTION

Figure 1:
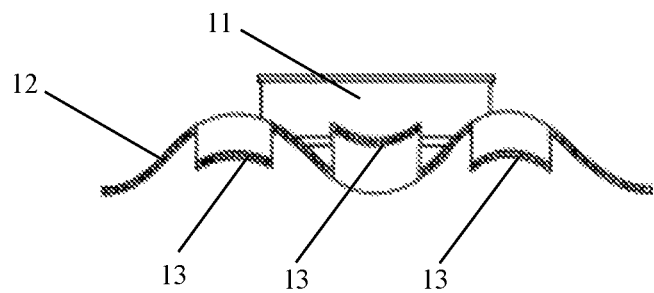
FIG. 1 shows a longitudinal cross-sectional view of the corrugated structure of a heat exchange fin of the prior art in the flow direction of fluid medium.

The technical solutions in the embodiments of the invention will be described below in a clear and complete manner in conjunction with the accompanying drawings. It is evident that the embodiments depicted are only a part of the embodiments of the invention, but not all of them. Based on the embodiments in the invention, all other embodiments obtained by those skilled in the art without creative effort fall within the scope of protection of the invention.

It should be noted that orientation terms such as upper, lower, left, right, front, rear, inner side, outer side, front side, top and bottom mentioned or possibly mentioned in the invention are defined relative to the configurations illustrated in the respective drawings. They are relative concepts, so they may change accordingly according to their different locations and different states of use. Therefore, these and other orientation terms shall not be construed as restrictive terms.

In addition, in the invention, expressions involving "first", "second", etc. are only used for descriptive purposes and cannot be interpreted as indicating or implying the relative importance thereof, or implying or indicating the number of indicated technical features. Therefore, features defined by "first" and "second" can explicitly or implicitly include at least one of the features. In the depiction of the invention, "a plurality of" means at least two, such as two, three, etc., unless otherwise specified.

In the depiction of the invention, the expressions such as referring to "one embodiment", "some embodiments", "examples", "specific examples", or "some examples" means that the specific features, structures, materials, or characteristics described in conjunction with the embodiment(s) or example(s) are included in at least one embodiment or example of the invention. In the invention, the schematic expressions of the above terms do not necessarily refer to the same embodiment(s) or example(s). In addition, the specific features, structures, materials, or characteristics described can be combined in an appropriate manner in any one or more embodiments or examples. Furthermore, those skilled in the art can combine the different embodiments or examples described in the invention and the features of different embodiments or examples without contradicting each other.

In the invention, unless otherwise specified and defined, the terms "connect", "fix", etc. should be interpreted in a broad sense. For example, "connect" can be a fixed connection, a detachable connection, or integration; or it can be a mechanical connection or an electrical connection; or it can be a direct connection, an indirect connection using an intermediate medium, or an internal connection between two components or the interactive relationship between two components, unless otherwise specified. Those skilled in the art can interpret the specific meanings of the above terms in the invention according to specific circumstances.

With the development of heat pump or air conditioning technologies and the improvement of energy efficiency standards for air conditioning at home and abroad, in order to meet the requirements of air conditioning energy efficiency, in addition to using high-performance compressors, it is also necessary to optimize the design of the heat exchanger by strengthening heat transfer technology. At the same time, since the heat exchange resistance of the heat exchanger is mainly the air-side heat exchange resistance, the way to strengthen the technologies of heat exchangers is mainly to optimize the design of the air-side fins, so as to enhance the performance of the heat exchangers.

Figure 2:
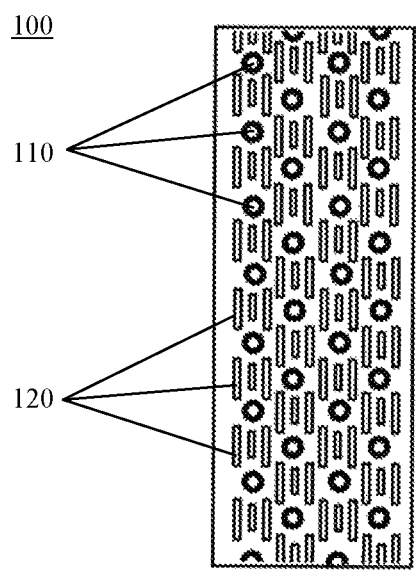
FIG. 2 shows a structural schematic diagram of an embodiment of the heat exchange fin of the invention.

As shown in FIG. 2, it schematically illustrates the structure of an embodiment of the heat exchange fin according to the invention in general. As can be clearly seen from FIGS. 2 and 3, the heat exchange fin 100 is provided with a plurality of tube holes 110 for inserting metal heat exchange tubes (not shown) into the tube holes 110. Refrigerant or coolant flows inside metal heat exchange tubes (such as circular tubes, elliptical tubes, or flat tubes), while fluid medium, such as air, flows outside the metal heat exchange tubes in a direction indicated by the arrow in FIG. 3 (i.e., in a direction parallel to the heat exchange fins). Heat conduction is achieved between the refrigerant and the air through the tube walls and the heat exchange fins, thus achieving heat exchange. Corrugated structures 120 are arranged near the tube holes 110, which helps to further increase the contact area between the fin body and the fluid medium. The corrugated structure 120 comprises a wave section arranged along the flow direction of air, where the distance between two adjacent wave crests or wave troughs of the wave section is one wavelength, and the total length of the wave section is 1-1.5 times the wavelength. For example, the heat exchange fin shown in FIG. 4 employs a "1.5 wave/row" corrugated structure 120, that is, the total length of the wave section in a row of corrugated structure 120 is designed to be 1.5 times the wavelength. In addition, bridge plates 130 are also arranged at the wave crests and wave troughs of the wave section. The bridge plate 130 deflects by a preset distance relative to the wave crest and wave trough, so that the airflow can break the continuously developing thermal boundary layer when flowing through the bridge plates, which enhances the turbulent flow, and significantly improves the heat transfer coefficient. Compared to the wave section adopting 2-times wavelength in the prior art, the wave section according to the invention has a larger corrugation width, a larger bridge plate width, and a smaller continuous corrugation section length, resulting in greater heat transfer efficiency. Therefore, the "1-1.5 wave/row" heat exchange fin according to the invention can provide better heat exchange performance than the traditional "2 wave/row" heat exchange fin.

In other preferred embodiments in conjunction with the aforementioned embodiment, the wave section is designed to form a wave having a sinusoidal cross section along the longitudinal cross-sectional direction of the flow direction of fluid medium, so that more fluid medium can pass through the heat exchanger of the same size, thereby achieving higher heat exchange efficiency and heat transfer coefficient. Of course, it is easy for those skilled in the art to conceive that the wave section can also be designed to have corrugations having trapezoidal, cosine, or triangular cross-sections along the flow direction of fluid medium.

Figure 3:
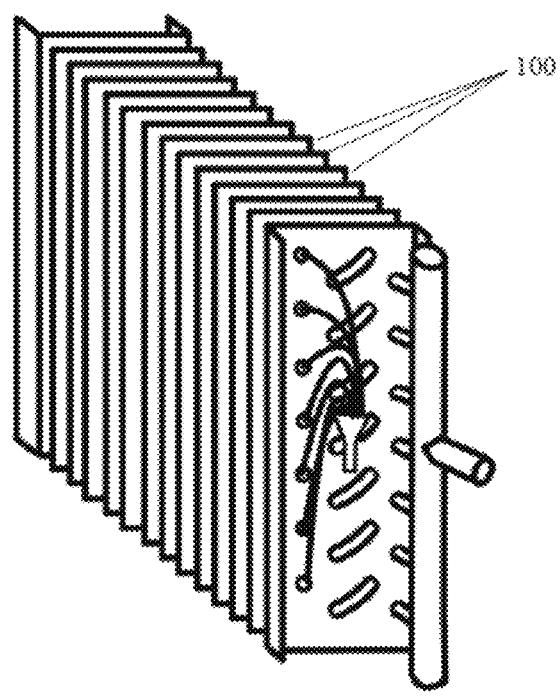
FIG. 3 shows a structural schematic diagram of the heat exchange fin of FIG. 2 installed in a heat exchanger.

It can also be seen in conjunction with FIGS. 2 and 3 that the heat exchange fins 100 are usually arranged side by side in the vertical direction inside the heat exchanger, while the flow direction of the fluid medium, or say the air, is usually perpendicular to the vertical direction. Specifically, the flow direction of air can be from left to right, or from right to left. On this basis, in order to further improve the heat exchange effect, the corrugated structure 120 can be arranged above or below the tube hole 110 in the vertical direction, and is symmetrically arranged relative to the vertical plane where the centerline of the tube hole 110 is located. That is to say, at least one bridge plate 130 is located on the vertical plane where the centerline of the tube hole 110 is located.

Figure 4:
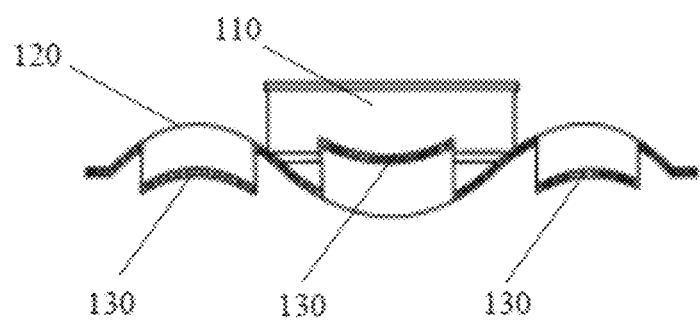
FIG. 4 shows a longitudinal cross-sectional view of the corrugated structure of the heat exchange fin of FIG. 2 in the flow direction of fluid medium.

With continued reference to FIG. 4, the bridge plates 130 of adjacent wave crest and wave trough deflect in the opposite direction in the vertical direction. For example, the bridge plate 130 deflects relative to the wave crest and wave trough by a preset distance in the range of 0.6-1.0 mm in the vertical direction; and/or the width of the bridge plate 130 is in the range of 2.6-3.0 mm. This design allows air to easily pass through the gap between the bridge plates and the fin body, which not only fully improves heat exchange effect, but also reduces air resistance. Of course, it is also feasible for the bridge plates 130 of adjacent wave crest and wave trough to deflect in the same direction in the vertical direction. It should be noted that the bridge plate of the wave crest and that of the wave trough can be either parallel to each other or not. If a plurality of bridge plates are not parallel to each other, the airflow passing through the corrugated structure is more complex. For the convenience of manufacturing, the bridge plate 130 can be formed by stamping.

Preferably, the heat exchange fins 100 can be made of aluminum alloy. Those skilled in the art are aware that aluminum material has good processability and good heat exchange performance.

In addition, the invention also provides a heat exchanger. The heat exchanger comprises: a plurality of heat exchange tubes for refrigerant flow, wherein the heat exchange tubes are separated from each other; and a plurality of the aforementioned heat exchange fins, wherein the heat exchange fins are vertically inserted into by the heat exchange tubes and are spaced at a preset distance from each other. As shown in FIG. 3, in the embodiment of the invention, the heat exchange fins are arranged side by side, so that for each heat exchange fin, the wave crests are aligned with each other and the wave troughs are aligned with each other. And, the shape, height, width, and inclination angle of each bridge plate are the same, so that the heat exchanger of the same size will have more heat exchange surfaces, thus improving the heat exchange area and efficiency of the heat exchanger. The heat exchanger according to the invention can significantly increase the vibration of the airflow, making the heat exchange process more intense, thus improving the heat exchange effect of the heat exchanger. As an example, the heat exchanger can be a condenser or an evaporator.

In some embodiments of the invention, the bridge plate deflects relative to the wave crest and wave trough by a preset distance that is half the distance between adjacent heat exchange fins. That is to say, the bridge plate is in the middle of the adjacent fins, so that the airflow can be evenly distributed on both sides of the bridge plate, so as to achieve lower flow resistance and higher heat transfer coefficient, thereby improving the overall heat exchange performance of the heat exchange fins.

Furthermore, the invention further provides a heat pump system. The heat pump system generally has multiple operating modes, including a cooling mode, a heating mode, and a dehumidification mode (also known as demisting mode). Specifically, the heat pump system mainly comprises a refrigerant circulation circuit and a water circuit. The refrigerant circulation circuit is sequentially provided with a compressor, a hot water heat exchanger, a throttling device, and an outdoor heat exchanger. The refrigerant is compressed by the compressor into high-temperature and high-pressure gas, and the high-temperature and high-pressure gas enters the hot water heat exchanger for heat exchange with the circulating water to heat the water. The refrigerant passing through the hot water heat exchanger is then throttled by the throttling device to form low-temperature and low-pressure liquid (or gas-liquid mixed refrigerant). The low-temperature and low-pressure liquid refrigerant evaporates in the outdoor heat exchanger, absorbing heat from the outside air to convert into a gaseous refrigerant. The gaseous refrigerant can further return to the compressor through a gas-liquid separator etc. when necessary, thus completing the refrigerant circulation circuit. The aforementioned heat pump system can be used in other household, commercial, or industrial equipment to improve the refrigeration efficiency of such equipment, which will not be specifically limited here.

In summary, compared to the heat exchange fins of the prior art, the heat exchange fins of the invention employ a "1-1.5 wave/row" corrugated structure design without changing the existing processing technology, processing equipment, and overall size of the heat exchange fins, which not only improves the heat transfer efficiency of the heat exchange fins, but also makes the structure of the plate-fin heat exchanger more compact. It can thus be seen that a heat exchanger configured with the heat exchange fins according to the invention can significantly improve the heat exchange performance of the heat exchanger in a heat pump system, thereby greatly improving the cooling and heating performance of the heat pump system.

Some specific embodiments are listed above to illustrate in detail the heat exchange fin, the heat exchanger configured with the heat exchange fin, and the heat pump system configured with the heat exchanger according to the invention. These individual examples are only used to illustrate the principle of the invention and the implementations thereof, but not to limit the invention. Those skilled in the art may, without departing from the spirit and scope of the invention, make various modifications and improvements. Therefore, all equivalent technical solutions shall belong to the scope of the invention and be defined by the various claims of the invention.

The invention claimed is:

1. A heat exchange fin, with a tube hole formed thereon for a heat exchange tube to be inserted into, and with a corrugated structure arranged near the tube hole, wherein the corrugated structure comprises a wave section arranged along a flow direction of fluid medium, where a distance between two adjacent wave crests or wave troughs of the wave section is one wavelength, and a total length of the wave section is 1-1.5 times the wavelength, and wherein a bridge plate is further arranged at the wave crests and wave troughs of the wave section, respectively, where the bridge plate deflects relative to the wave crests and wave troughs by a preset distance, and wherein the wave section is the total length of corrugation in the corrugated structure.

2. The heat exchange fin according to claim 1, wherein the wave section forms a corrugation having a sinusoidal, cosine, trapezoidal, or triangular cross-section along a longitudinal cross-sectional direction of the flow direction of fluid medium.

3. The heat exchange fin according to claim 2, wherein the corrugated structure is located above or below the tube hole in a vertical direction, and is symmetrically arranged relative to a vertical plane where a centerline of the tube hole is located.

4. The heat exchange fin according to claim 1, wherein adjacent bridge plates deflect in opposite directions in the vertical direction.

5. The heat exchange fin according to claim 1, wherein the bridge plate deflects relative to the wave crest and wave trough by a preset distance in the range of 0.6-1.0 mm; and/or a width of the bridge plate is in a range of 2.6-3.0 mm.

6. The heat exchange fin according to claim 1, wherein the bridge plate is formed by stamping.

7. The heat exchange fin according to claim 1, wherein the heat exchange fin is made of aluminum alloy.

8. A heat exchanger, comprising:
a plurality of heat exchange tubes for refrigerant flow, wherein the heat exchange tubes are separated from each other; and
a plurality of the heat exchange fins according to claim 1, wherein the heat exchange fins are vertically inserted into by the heat exchange tubes and are spaced at a preset distance from each other.

9. The heat exchanger according to claim 8, wherein the bridge plate deflects relative to the wave crest and wave trough by a preset distance that is half the distance between adjacent heat exchange fins.

10. The heat exchanger according to claim 8, wherein the heat exchanger is a condenser or an evaporator.

11. A heat pump system, wherein the heat pump system comprises the heat exchanger according to claim 8.

12. A heat exchange fin, with a tube hole formed thereon for a heat exchange tube to be inserted into, and with a corrugated structure arranged near the tube hole, wherein the corrugated structure comprises a wave section arranged along a flow direction of fluid medium, where the wave section is the total length of corrugation in the corrugated structure, where a distance between two adjacent wave crests or wave troughs of the wave section is one wavelength, and a total length of the wave section is 1-1.5 times the wavelength.

13. The heat exchange fin according to claim 12, wherein a bridge plate is further arranged at the wave crests and wave troughs of the wave section, respectively.

* * * * *